June 9, 1964   V. D. DAILEY   3,136,228
PISTON STRUCTURE
Filed Feb. 5, 1962
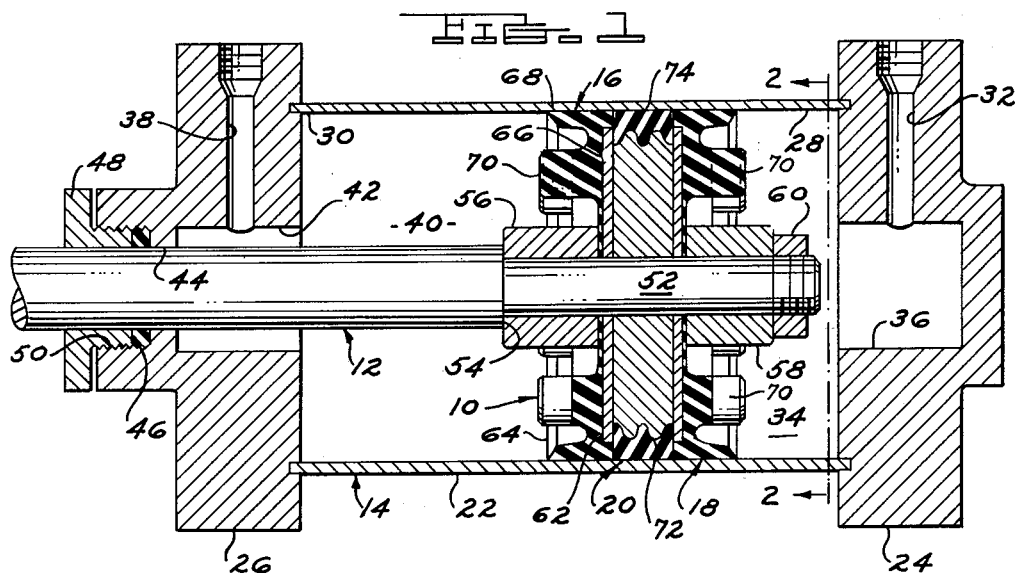
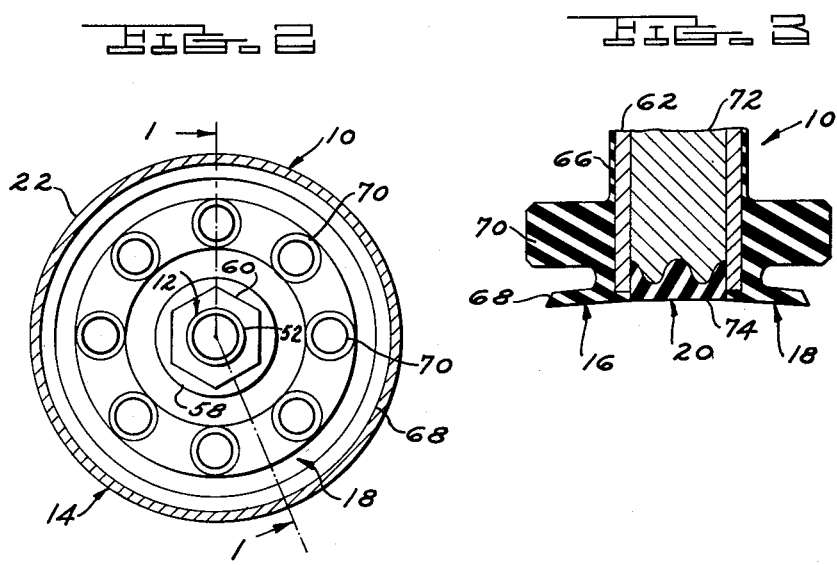
INVENTOR
VACELL D. DAILEY
BY Whittemore,
Hulbert & Belknap
ATTORNEYS United States Patent Office 3,136,228
Patented June 9, 1964

3,136,228
PISTON STRUCTURE
Vacell D. Dailey, Waterford, Mich., assignor to Baldwin-Montrose Chemical Company Incorporated (Baldwin Division), Pontiac, Mich., a corporation of Indiana
Filed Feb. 5, 1962, Ser. No. 171,195
6 Claims. (Cl. 92—85)

The invention relates to piston structures and refers more specifically to a multiple element piston including separate cushioning and sealing portions in combination with a separate guiding portion which piston is particularly suited for use in installations wherein an off center or eccentric force may be applied thereto during operation.

Prior pistons wherein a unitary sealing member has been bonded to an annular disc having a relatively short axial dimension have been subject to premature failure on piston misalignment such as that caused by a small angle existing between a cylinder in which the piston is reciprocally mounted and the piston rod to which the piston is secured. With such structures the relatively soft flexible sealing lips or flanges of the piston are required to withstand stresses placed on the piston by the misalignment whereby the sealing flanges are rapidly deteriorated.

Further the unitary sealed pistons of the past have generally been structurally restricted to operation at pressures of two hundred pounds per square inch maximum. In addition, past piston structures wherein integral resilient material has been provided around the circumference of and on the axial surfaces of an annular disc have been relatively difficult to produce since with such construction the disc need be supported centrally of a cavity in which the resilient material is molded.

It is therefore one of the objects of the present invention to provide an improved piston structure capable of withstanding substantial off center forces producing piston misalignment in operation.

Another object is to provide an improved piston structure including separate sealing and cushioning end portions and a separate central portion for guiding the piston during operation thereof.

Another object is to provide a piston structure as set forth above wherein each of the end portions includes an annular relatively rigid disc having a radially outer axially extending annular sealing lip of relatively soft flexible material secured thereto.

Another object is to provide a piston structure as set forth above wherein each of the end portions includes an annular relatively rigid disc having a plurality of radially inner axially extending angularly spaced resilient cylinders secured thereto for cushioning the piston in operation.

Another object is to provide a piston structure as set forth above wherein the central portion comprises an annular mounting ring having a relatively hard low friction material secured thereto around the outer circumference thereof.

Another object is to provide an improved piston and cylinder construction comprising a cylinder, a piston rod and a piston secured to the piston rod and mounted for reciprocation within the cylinder, said piston including a pair of axially outer sealing and cushioning portions each comprising an annular disc and a relatively soft flexible member bonded thereto including an annular sealing flange and cushioning bumpers, and a central portion positioned between the axially outer portions comprising an annular supporting ring having an annular member of relatively hard, low friction material secured to the radially outer circumference thereof for guiding the piston in its reciprocal movement within the cylinder.

Another object is to provide a piston structure comprising an annular relatively rigid supporting ring having an annular ring of relatively hard, low friction material secured to the radially outer circumference thereof for guiding a piston in reciprocal movement within a cylinder.

Another object is to provide a piston structure which is simple in construction, economical to manufacture and efficient in use.

Other objects and features of the invention will become apparent as the description proceeds, especially when taken in conjunction with the accompanying drawings, illustrating a preferred embodiment of the invention, wherein:

FIGURE 1 is a longitudinal section view of a piston constructed in accordance with the invention mounted on a piston rod in a cylinder.

FIGURE 2 is a cross section of the piston and cylinder structure shown in FIGURE 1 taken substantially on the line 2—2 in FIGURE 1.

FIGURE 3 is an enlarged section of the circumferential portion of the piston structure shown in FIGURE 1.

With particular reference to the figures of the drawing one embodiment of the present invention will now be disclosed in detail.

As shown in FIGURE 1 the piston structure 10 of the invention is mounted on the piston rod 12 for reciprocal movement within the cylinder 14. The piston structure 10 includes the separate axially outer end portions 16 and 18 which are identical and the central piston guiding portion 20.

In operation on reciprocation of the piston 10 within the cylinder 14 the piston 10 is sealed and cushioned in its movement in opposite directions by the piston portions 16 and 18. The central piston guiding portion 20 operates to relieve any stresses on the sealing flange of the axially outer portions 16 and 18 due to any piston misalignment during movement of the piston 10 within the cylinder 14 and to permit operation of the piston and cylinder construction at high pressures.

More specifically the cylinder 14 comprises the cylindrical sleeve 22 in which the piston 10 is mounted. The piston end plates 24 and 26 which may be secured to the opposite ends 28 and 30 respectively of the sleeve 22 by convenient means (not shown) are also a part of the cylinder 44.

The cylinder end plate 24 is provided with the passage 32 extending radially thereof to permit the entry and exhaust of piston actuating media into and out of the chamber 34 formed by the sleeve 22, end plate 24 and the piston 10. Recess 36 is provided in the end plate 24 centrally thereof between the passage 32 and chamber 34 to provide air cushioning for the piston 10 as will be considered subsequently.

The end plate 26 of cylinder 14 similarly includes a passage 38 extending radially therethrough to permit passage of piston actuating media into and out of the chamber 40 formed between the end plate 26, sleeve 22 and piston 10. Also a recess 42 is provided in the plate 26 to provide air cushioning for the piston 10 on leftward movement thereof as shown in FIGURE 1. In addition an axial passage 44 is provided in the end plate 26 through which the piston rod 12 extends into the cylinder 14. The passage 44 is sealed by sealing material 46 in conjunction with the nut 48 threaded into the recess 50 in the end plate 26.

The piston 10 is sleeved over the piston rod 12 as shown best in FIGURE 1. Thus the piston rod 12 has a reduced diameter end portion 52 providing the abutment 54 therearound against which the cushioning sleeve and piston spacer 56 is abutted. As illustrated in FIGURE 1 the portion 16 of the piston 10 is then abutted against the cushioning sleeve and spacer 56 followed by the portions 20 and 18 of the piston 10 and the cushioning sleeve and piston spacer 58. The sleeves 56 and 58 and the piston portions 16, 18 and 20 are held in assembly on the reduced diameter portion 52 of the piston rod 12 by the nut 60.

It will be understood that the sleeves 56 and 58 are of substantially the same exterior diameter as the interior diameter of the recesses 42 and 46 respectively in the end plates 24 and 26. Therefore in operation the sleeves 56 and 58 trap air in the recesses 42 and 46 on reciprocation of the piston rod 12 to provide an air cushion for the piston 10 at each end of its stroke in the usual manner.

The sealing and cushioning portions 16 and 18 of the piston 10 are identical. Each of the portions 16 and 18 includes an annular disc 62 which may be of metal or other similarly rigid material to which an integral sealing and cushioning member 64 is bonded. The sealing and cushioning member 64 extends over one entire axial surface 66 of the disc 62, includes an annular lip portion 68 positioned radially outwardly of the outer circumference of the disc 62 and the bumper portions 70 which are positioned radially inwardly of the outer circumference of the disc 62.

The lip portion 68 of the sealing and cushioning member 64 as best shown in FIGURE 3 is relatively thin radially and extends axially of the piston a substantial distance so that it is relatively flexible and therefore functions to tightly engage the wall of the sleeve 22 of the cylinder 14 on fluid actuating media within the cylinder 14 exerting a pressure radially outwardly thereon. Without fluid pressure from the actuating media being exerted on lip 68 the lip will not provide primary sealing for the piston 10. Due to the radially outward tapering of the lip 68 axially of the disc 62 as shown in FIGURE 3 a prestressing of the lip 68 in assembly is accomplished whereby secondary sealing is provided at all times thereby.

Thus it will be seen that in operation the lip 68 of each piston portion 16 and 18 provides a breathing effect. For example, on build up of pressure in the chamber 40 to produce movement of the piston 10 to the right in FIGURE 1 the lip 68 of piston portion 16 is forced radially outwardly into primary sealing contact with the sleeve 22 of cylinder 14. On the return stroke the lip 68 of piston portion 16 provides only a secondary seal for the piston 10. The opposite action is of course true of the lip 68 of the piston portion 18 so that both a primary and a secondary piston seal are provided on movement of the piston in either direction.

The bumper 70 provided on the sealing and cushioning members 64 of the piston 10 are cylindrical and are spaced angularly about the annular discs 62, as best shown in FIGURE 2. The bumpers 70 function to provide additional cushioning for the piston 10 in its movement toward the end plates 24 and 26 of the cylinder 14. It will be particularly noted that the bumpers 70 extend axially of the piston 10 beyond the lips 68 so that the lips 68 do not contact the end plates 24 and 26 of the cylinder 14.

The guiding portion 20 of the piston 10 which is sandwiched between the sealing and cushioning portions 16 and 18, as shown best in FIGURES 1 and 3, comprises an annular supporting ring 72 and an annular ring of low friction material such as Delrin plastic secured to the radially outer circumference of the supporting ring 72. The low friction material is relatively hard with respect to the rubber or other relatively soft material of the sealing and cushioning members of the portions 16 and 18 of the piston 10. The annular supporting ring 72 is of substantial axial dimension as shown in FIGURE 1 whereby relatively high pressures may be withstood by the piston 10 and in operation the piston 10 is guided within the sleeve 22. Thus any stresses which might otherwise be applied to the relatively soft sealing lips or flanges 68 of the portions 16 and 18 of the piston 10 are resisted by the relatively hard low frictional material 74 which results in substantially increased life of the piston 10 particularly in constructions wherein some eccentric force is applied to the mounting of the piston 10 within the sleeve 22.

In over-all operation of the piston and cylinder construction illustrated in FIGURE 1, on the introduction of piston actuating media into the chamber 34 through the passage 32 and recess 36 and the exhaust of piston actuating media from the chamber 40 through the recess 42 and the passage 38 the lip 68 of the portion 18 of the piston 10 tightly engages the inner wall of the sleeve 22 to seal the piston 10 and the piston is moved toward the end wall 26 of the cylinder 14. As the spacer and cushioning sleeve 54 enters the recess 42 air cushioning is provided for the piston 10. On further movement of the piston 10 toward the end plate 26 the bumpers on the portion 16 of the piston 10 engage the end plate 26 to further cushion the piston 10.

During movement of the piston 10 toward the end plate 26 the sealing lips of the portions 16 and 18 of the piston 10 are not subjected to stresses due to eccentric mounting of the piston or piston rod within the cylinder since the central portion 20 of the piston 10 resists these forces. In particular the relatively hard low friction circumferentially extending radially outer ring 74 of portion 20 of piston 10 resists such forces. The useful life of the piston and the pressures which it is capable of withstanding are thereby substantially increased.

On exhaust of actuating media from the chamber 34 and passage of actuating media into the chamber 40 the opposite operation takes place. Thus the movement of the piston 10 in a rightward direction is provided with the lip 68 of the portion 16 of the piston sealing between the sleeve 22 and the piston 10 and with the bumper 70 of the portion 18 of the piston 10 providing additional cushioning for the piston. Again the central portion 20 of the piston 10 functions as a guide to prevent excessive wear of the piston 10 due to off center mounting of the piston 10 or piston rod 12 and to permit the use of the piston 10 with extremely high pressures.

The drawings and the foregoing specification constitute a description of the improved piston structure in such full, clear, concise and exact terms as to enable any person skilled in the art to practice the invention, the scope of which is indicated by the appended claims.

What I claim as my invention is:

1. Piston structure comprising a central guiding portion including a separate supporting ring having a ring of low friction material secured to the outer circumference thereof and a separate sealing and cushioning portion at each side of the central guiding portion each including an annular disc having a sealing and cushioning member bonded to the side thereof opposite the guiding portion of the piston, said sealing and cushioning member including a circumferentially extending radially outer annular sealing lip and axially extending angularly spaced bumpers positioned radially inwardly of the outer circumference of the disc.

2. Piston and cylinder construction comprising a cylinder, a piston rod extending through one end of the cylinder, and a piston mounted on the end of the piston rod within the cylinder for reciprocal movement therein comprising a guide portion including an annular supporting ring sleeved over the piston rod and a ring of relatively hard, low friction material secured to the outer circumference of the supporting ring, and a sealing and cushioning portion positioned at each side of the guide portion of the piston each including an annular disc also sleeved over the piston rod and a sealing and cushioning member bonded thereto including an annular lip extending axially outwardly of the guiding portion of the piston positioned radially outwardly of the annular disc and bumper portions also extending axially outwardly of the guiding portion of the piston positioned radially inwardly of the radially outer circumference of the disc and spaced angularly thereabout.

3. Piston structure comprising a central guiding portion including a separate supporting ring having a ring of low friction material secured to the outer circumference thereof and a separate sealing and cushioning portion at each side of the central guiding portion, each including an annular disc of small axial extent as compared to the supporting ring, a sealing and cushioning member bonded to the side of each annular disc opposite the guiding portion of the piston, said sealing and cushioning member including a circumferentially extending radially outer annular sealing lip of substantially the same maximum radial dimension as the maximum radial dimension of the low friction material and of substantially the same axial extent as the low friction material of the central guiding portion of the piston.

4. Piston and cylinder construction comprising a piston rod extending through one end of the cylinder having a reduced diameter end thereon within the cylinder, a first sleeve sleeved over the reduced diameter end of the piston rod, a three-part piston sleeved over the reduced diameter end of the piston rod and abutting the first sleeve including a first central guiding part having a separate supporting ring and a ring of low friction material secured to the outer circumference of the supporting ring and separate second third sealing and cushioning parts of the three-part piston at each side of the central part, each sealing the cushioning part having an annular disc of small extent axially of the piston rod in comparison to the axial extent of the supporting ring with a sealing and cushioning member bonded to the side thereof opposite the central part of the piston, said sealing and cushioning member including a circumferentially extending radially outer sealing lip having a maximum radial extent substantially equal to the maximum radial extent of the low friction material and an axial extent substantially equal to the axial extent of the low friction material and axially extending angularly spaced bumpers positioned radially inwardly of the outer circumference of the disc.

5. Piston structure comprising a separate central guiding portion including a rigid annular ring and a ring of low friction material secured to the outer circumference of the annular ring and a separate sealing portion positioned at each side of the central guiding portion, each of said separate sealing portions including an annular rigid disc and a sealing member bonded to the annular disc, said sealing member including a circumferentially extending annular sealing lip positioned radially outwardly of the outer circumference of the annular disc.

6. Structure as set forth in claim 5 wherein the sealing member of each of the separate sealing portions of the piston structure extends over the side of the annular disc with which it is associated opposite the guiding portion of the piston structure and axially outwardly extending cushioning means located radially inwardly of said sealing lip are provided integral with said sealing member.

References Cited in the file of this patent
UNITED STATES PATENTS

| | | |
|---|---|---|
| 1,577,732 | Lamb | Mar. 23, 1926 |
| 2,895,773 | McConnaughey | July 21, 1959 |
| 2,962,330 | Kohl | Nov. 29, 1960 |
| 2,984,529 | Dailey | May 16, 1961 |